Sept. 6, 1927. J. K. KINNEAR 1,641,226
HANDLE
Filed April 16, 1926
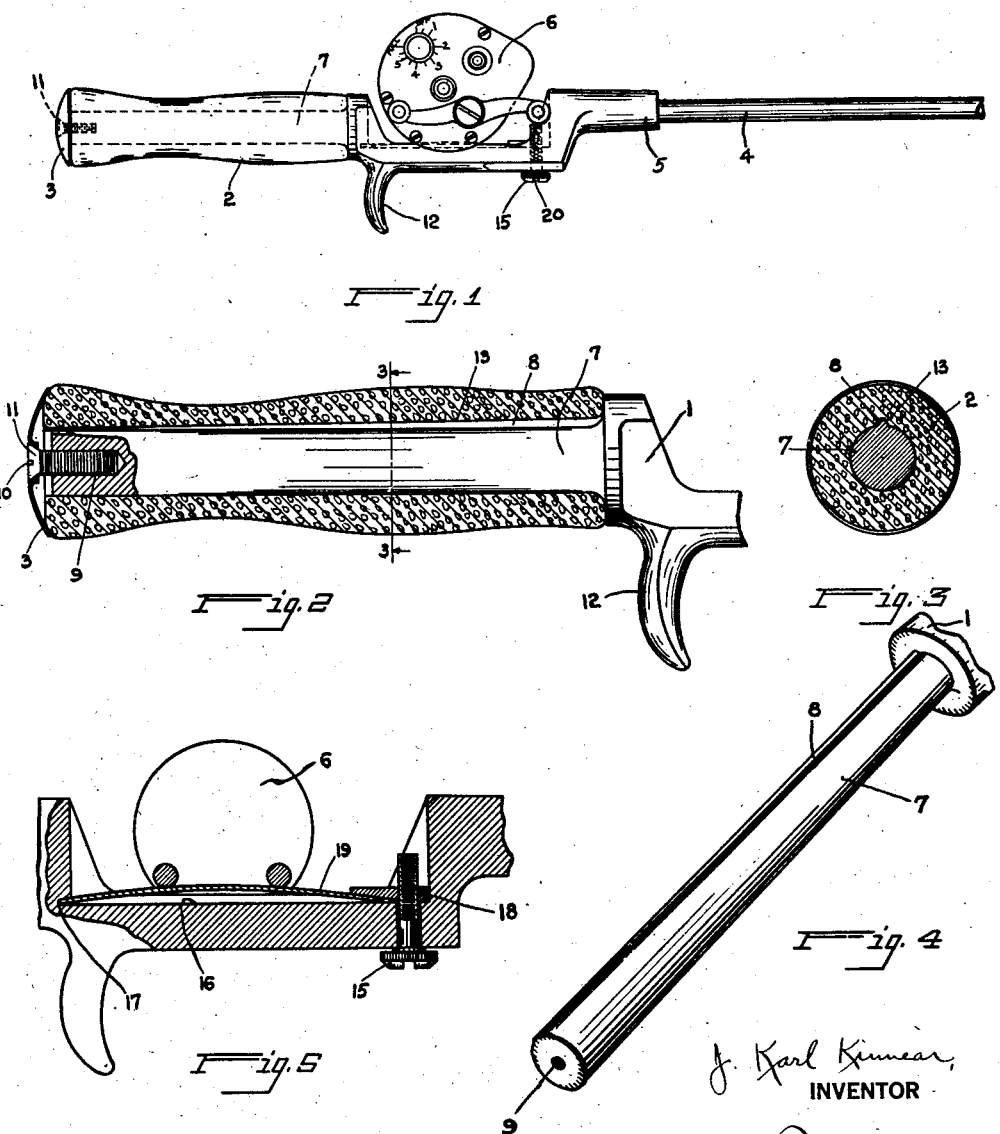

Patented Sept. 6, 1927.

1,641,226

UNITED STATES PATENT OFFICE.

JOHN KARL KINNEAR, OF GENEVA, OHIO.

HANDLE.

Application filed April 16, 1926. Serial No. 102,433.

My invention relates to handles and relates more particularly to a hand grip for that type of handle employed on fishing rods, tools, mallets, game pieces and the like.

An object of my invention is to provide a handle comprising impressionable material which can be readily detached from the instrument or tool but which will not rotate with relation to its shank on the body of the handle.

Another object and advantage of my handle is that the same may be easily and quickly assembled inexpensively, and yet possess the quality of durability and pleasing appearance.

Another object of my invention is to provide a handle adapted to detachably support a fishing reel in a convenient manner adjacent the hand grip portion of my handle.

Another object of my invention is to so construct the handle that the user may be afforded a good grip on the handle with resultant accuracy and efficiency while using the article employing the handle.

Other objects and advantages will be apparent by reference to the following specification and drawings wherein, Fig. 1 is an elevational view of my handle having applied thereto a fishing rod and reel;

Fig. 2 is a longitudinal sectional view of the grip portion of my handle on its shank together with the retaining means;

Fig. 3 is a transverse sectional view on the line 3—3 of Fig. 2;

Fig. 4 is a perspective view of the shank showing a portion of the body of the instrument; and Fig. 5 is a longitudinal section of a portion of the handle showing the reel retaining means.

Referring more particularly to the drawings wherein like reference characters represent similar parts throughout the drawings and specification, 1 represents a fishing rod handle preferably cast of light metal and provided with a grip portion 2, preferably composed of cork or a like impressionable material. 3 designates a retaining means for the grip portion 2. At the opposite end of my handle from the said grip portion 2, I have provided a socket 5 for the reception of a fishing rod 4. Supported in any suitable manner upon the handle 1 and detachable therefrom, is the fishing reel 6 of any conventional type, secured in an offset portion of the handle adapted for the reception thereof.

Extending from the handle portion 1 and preferably forming an integral portion thereof, I have provided a shank 7 preferably circular in cross section and provided with an upstanding tapered rib 8, the rib extending and terminating at its highest point nearest the handle body 1 and diminishing towards the end of the shank 7. The end of the shank 7 is provided with a threaded recess 9 for the reception of a screw 10, the retaining plate 3 in position against the outer end of the grip portion 2. The plate 3 is preferably countersunk in the center to receive the tapered head 11 of the screw 10.

The handle grip 2 is impressed with a longitudinal groove 13 by the tapered rib 8 extending throughout the entire length of the shank 7. The hand grip of impressionable material readily receives first a shallow groove formed by the rib 8 in the shaft 7, gradually increasing in depth as the grip is forced onto the shank 7. It will be seen by forcing the handle grip 2 into telescoping engagement with the shank 7, the tapered rib 8 forms the tapered groove 13 of the hand grip 2; the cork, or like material being compressible and resilient, affording a tight connection between the parts, and the rib and groove prevent relative rotation between the hand grip 2 and shank 7. As heretofore stated, the retaining plate 3 is then applied and secured to the shank 7 by means of the bolt 9 thereby clamping the hand grip in place and preventing any longitudinal movement of the grip portion 2 on its shank 7.

Depending from the handle body 1 and forming an integral part thereof, is a finger grip portion 12. The user grips the handle at 2 and places his index finger over the depending member 12, thereby affording a good grip on the handle somewhat in the nature of a pistol grip.

The reel retaining means of the handle heretofore referred to, comprises a flattened offset portion 16 of the body portion of the handle and which has a slot 17 at one end and a removable clamping plate 18 at the opposite end, adapted to be clamped in place on the handle 1, by the thumb screw 15.

The provision of the tapered rib as herein illustrated and described, permits grips of cork, or like material, to be forced onto the handle with a minimum of effort and without disrupting the material of the grip and at the same time holds the grip and handle relatively non-rotatable.

In the embodiment of my invention illustrated and described herein, I have applied my handle and gripping portion to a fishing rod, however, it will be understood that the handle and grip retaining means can be applied to many articles of this general nature.

Having thus described my invention in a single embodiment, I am aware that numerous and extensive departures may be made from the embodiment herein illustrated and described, but without departing from the spirit of my invention.

What I claim is:

1. In a handle of the class described, the combination with a substantially cylindrical grip having a longitudinal bore of circular cross section, said grip adapted to be forced longitudinally onto a handle shank from an end thereof, said shank being provided on its outer surface with a longitudinal rib, said rib being of progressively decreasing size in transverse dimension as the said shank end is approached, said grip being of relatively softer material than the rib, whereby the rib will groove an inner wall of the bore when the grip is forced onto the shank.

2. In a handle of the class described, the combination with a substantially cylindrical grip having a longitudinal bore of circular cross section, said grip adapted to be forced longitudinally onto a handle shank from an end thereof, said shank having an aligned laterally extending portion disposed along its length of progressively smaller dimensions towards its outer extremity, said grip being of pliable material, whereby the said lateral extension of the shank will groove an inner wall of the bore when the grip is forced onto the shank.

3. In a handle of the class described, the combination with a substantially cylindrical wood grip having a longitudinal bore of circular cross section, said grip adapted to be forced longitudinally onto a handle shank from an end thereof, said shank being provided on its outer surface with a longitudinal metallic rib, said rib being of progressively decreasing size in transverse dimension as the said shank end is approached, said grip being of relatively softer material than the rib, whereby the rib will groove an inner wall of the bore when the grip is forced onto the shank.

4. In a handle of the class described, the combination with a substantially cylindrical cork grip having a longitudinal bore of circular cross section, said grip adapted to be forced longitudinally onto a handle shank from an end thereof, said shank being provided on its outer surface with a longitudinal rib, said rib being of progressively decreasing size in transverse dimension as the said shank end is approached, said grip being of relatively softer material than the rib, whereby the rib will groove an inner wall of the bore when the grip is forced onto the shank.

5. In a handle of the class described, the combination with a substantially cylindrical grip of pliable material having a longitudinal bore of circular cross section, said grip adapted to be forced longitudinally onto a handle shank from an end thereof, said shank being provided on its outer surface with a longitudinal rib, said rib being of progressively decreasing size in transverse dimension as the said shank end is approached, said grip being of relatively softer material than the rib, whereby the rib will groove an inner wall of the bore when the grip is forced onto the shank.

In testimony whereof I hereunto affix my signature this 16th day of March, 1926.

J. KARL KINNEAR.